United States Patent
King

Patent Number: 5,641,022
Date of Patent: Jun. 24, 1997

[54] METHOD FOR REMOVING PARAFFIN AND ASPHALTENE FROM PRODUCING WELLS

[76] Inventor: Michael King, 4326 Clearwater Loop, Lacey, Wash. 98503

[21] Appl. No.: 543,299

[22] Filed: Oct. 16, 1995

Related U.S. Application Data

[63] Continuation-in-part of Ser. No. 362,142, Dec. 22, 1994, abandoned.

[51] Int. Cl.$^6$ .................................... E21B 36/00
[52] U.S. Cl. ................ 166/303; 166/53; 166/57; 166/90.1; 166/304
[58] Field of Search ........................... 166/303, 304, 166/53, 57, 90.1

[56] References Cited

U.S. PATENT DOCUMENTS

| | | | |
|---|---|---|---|
| 1,439,560 | 12/1922 | Lee | 166/303 |
| 1,462,288 | 7/1923 | Knox . | |
| 1,525,656 | 2/1925 | Redfield . | |
| 1,646,599 | 10/1927 | Schaeffer . | |
| 1,681,523 | 8/1928 | Downey et al. . | |
| 1,835,400 | 12/1931 | Ingison et al. . | |
| 2,561,249 | 7/1951 | Tomlinson . | |
| 2,639,774 | 5/1953 | Rhoads . | |
| 2,644,531 | 7/1953 | McLean . | |
| 2,836,248 | 5/1958 | Covington . | |
| 2,881,301 | 4/1959 | Bowman . | |
| 3,045,099 | 7/1962 | Bowman . | |
| 3,478,825 | 11/1969 | Closmann | 166/303 X |
| 4,174,752 | 11/1979 | Slater et al. | 166/303 |
| 4,289,204 | 9/1981 | Stewart . | |
| 4,830,111 | 5/1989 | Jenkins et al. | 166/303 |
| 4,836,286 | 6/1989 | Edwards . | |
| 4,911,240 | 3/1990 | Haney et al. | 166/304 |
| 5,247,994 | 9/1993 | Nenninger . | |
| 5,265,677 | 11/1993 | Schultz . | |

*Primary Examiner*—Hoang C. Dang
*Attorney, Agent, or Firm*—Robert W. Jenny

[57] ABSTRACT

The basic method is to raise the temperatures of the tube, rod and liquid in the well into a range in which paraffin and asphaltene are removable by fluid flow in and from the well. The temperatures are raised by circulating the liquid through the well and a heat exchanger which heats the fluid which subsequently heats the well components. The well pump provides the circulation flow. In a preferred practice of the method, operation is such that the annulus of the well is essentially empty and the liquid recirculated until the difference between the temperatures of fluid flowing into the well and on the outer surfaces of the tube and fluid flowing out is within a desired range and then some of the fluid is diverted to storage while the remaining fluid is recirculated and heated to maintain the higher temperatures throughout the well as long as needed.

1 Claim, 1 Drawing Sheet

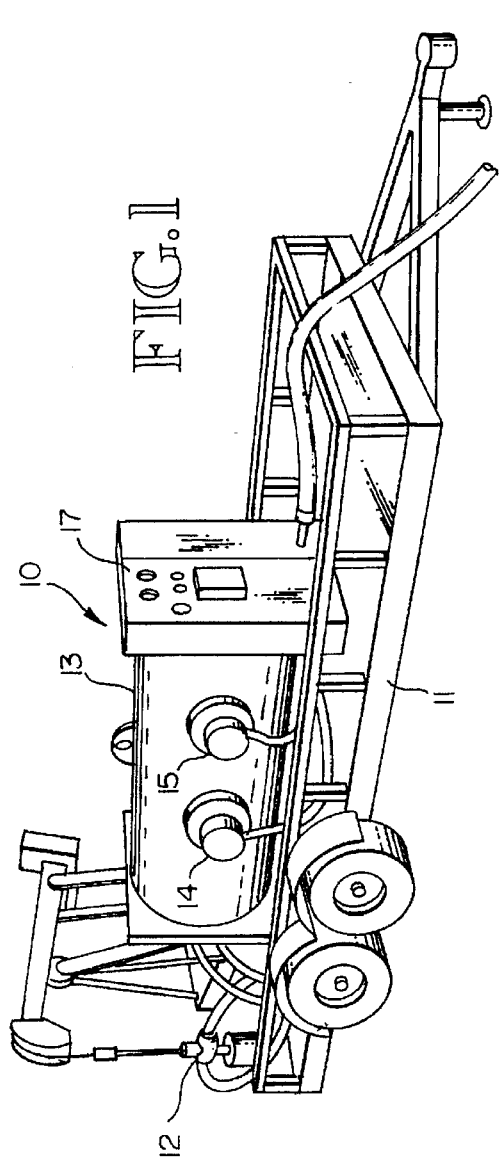
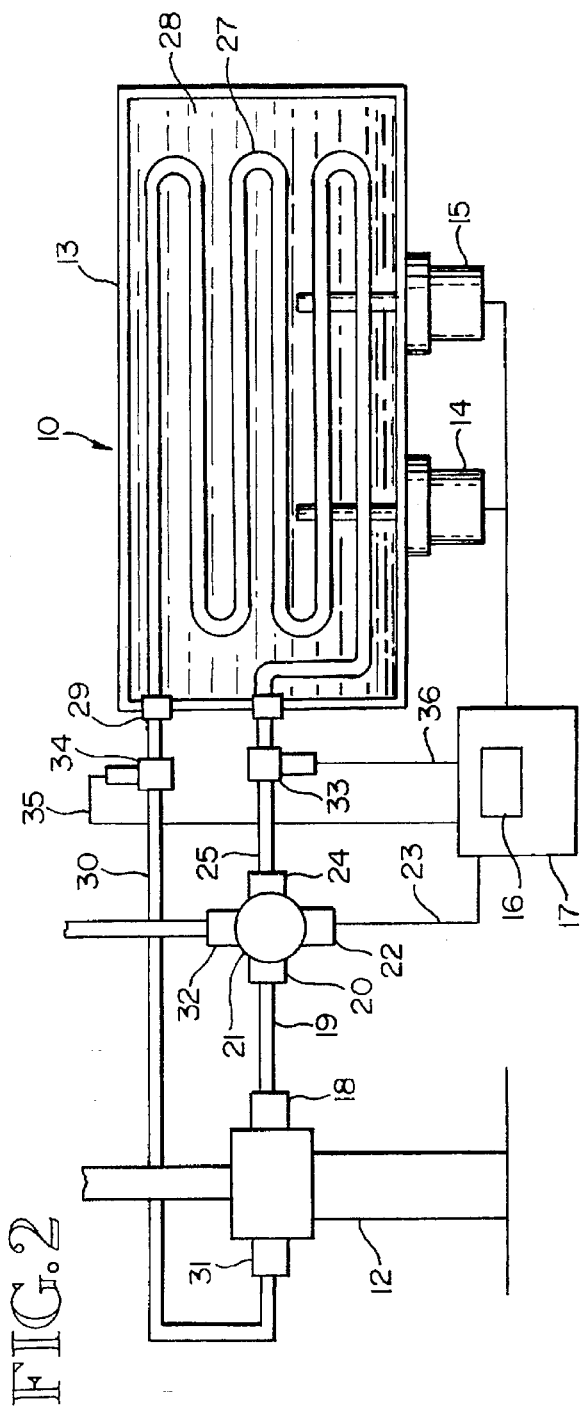

METHOD FOR REMOVING PARAFFIN AND ASPHALTENE FROM PRODUCING WELLS

This application is a Continuation-In-Part application based on application Serial No. 362,142, filed Dec. 22 1994, to be abandoned when the subject application is duly filed.

BACKGROUND OF THE INVENTION

1. Field

The subject invention is in the field of methods and apparatus used in the construction, use and maintenance of oil wells. Specifically, it is in the field of methods and apparatus used to maintain oil wells. More specifically, it is in these fields as related to removing products from the wells which interfere with the production of oil by the wells, products such as paraffin and asphaltene.

2. Prior Art

The basic techniques for removal of such products are (1) to raise the temperature of the contents of the well sufficiently to reduce the viscosities of the products enough to allow their mixing with the other products in the well and being carried away with the other products as they are removed from the well; (2) chemical treatment of the well contents to effect removal of the products or alleviate their effects; and (3) combinations of chemical treatment and heating. The U.S. patents listed below are a sampling of the prior art.

| | |
|---|---|
| 1,462,288 | 2,836,248 |
| 1,525,656 | 2,881,301 |
| 1,646,599 | 3,045,099 |
| 1,681,523 | 4,289,204 |
| 1,835,400 | 4,836,286 |
| 2,561,249 | 5,247,994 |
| 2,639,774 | 5,265,677 |
| 2,644,531 | |

U.S. Pat. Nos. 1,525,656, 1,835,400 and 2,836,248 show electrically powered heaters intended for use deep in a well. U.S. Pat. No. 4,836,286 discloses method and apparatus for chemically treating well fluids at the output of the well to remove paraffin, asphalt, etc. and returning the treated fluids to the annulus of the well. The most commonly used technique for removing paraffin and asphaltenes is termed "Hot Oiling". In this technique a quantity of oil is heated to between 150° F. and 300° F. and pumped into the annulus of the well, the annulus being the space between the tube of the well and the casing in the well. U.S. Pat. Nos. 1,462,288 and 2,639,774 show methods and apparatus for heating the liquid produced by a well and recirculating all of the output into the well to bring the temperatures of the liquid in the casing and of the tube, casing and formation into which the bore was made to levels high enough to liquefy paraffin, asphaltene, etc. so that they will mix with the liquid and be carried out of the well when all or some of the output is diverted from recirculation into processing and/or storage facilities.

The equipment for each of the prior art methods or systems is permanently installed at each well served.

The prior art methods and equipment for treating wells to remove paraffin, asphaltene and the like is not known to have been or be commercially successful. This is considered to be attributable to the facts that (1) it is not economically feasible to remove paraffin, asphaltene and the like from producing wells by heating the liquid in the well, the tube, the casing and the formation around the well and (2) the equipment used is installed permanently at each well treated even though it is not necessary to continually treat each well, i.e. it is entirely acceptable to treat wells periodically to remove the paraffin, asphaltene and the like. It has also been found that it is not economically feasible to heat the well casing because heating applied to the casing bleeds off to the surrounding formation which has great heat capacity.

As further background of the invention for purposes of this disclosure and, as is well known in the art, an oil well comprises a hole bored into the earth, termed the bore, a tubular casing in the bore, cement between the casing and the bore, a tube enclosed in the casing with space termed the annulus between the outside of the tube and the inside of the casing and a rod which fits closely in the tube and is moved longitudinally in the tube to pump the liquid in the well. Accumulation of paraffin, asphaltene and the like between the rod and tube significantly increases the power required to move the rod in the tube and avoidance of the costs for the increase in power is a major reason for removing the paraffin, asphaltene and the like from the well. In view of these problems with the known prior art, reviewed briefly above, it is recognized that there is a long standing need for a more economical method and related apparatus for removing paraffin asphaltene from producing oil wells without harming the well. Accordingly, the primary objective of the subject invention is to provide such a method. A second objective is that the method and apparatus improve the condition of treated wells.

SUMMARY OF THE INVENTION

The subject invention is a method and for removing paraffin and asphaltene from producing oil wells. The method comprises the steps of:

1. Providing means for heating the liquids produced by the well;
2. providing means to cause the liquids produced by the well to flow through the means for heating and into the well directed against and flowing along the exterior of the tube and out of the well; these means comprising signal-controlled valving controlled to adjust to a first operating condition in which all of the produced oil flows through the heat exchanger and into and out of the well and to a second operating condition in which part of the produced oil flows through the heat exchanger and into and out of the well;
3. providing means for managing the pumping and flow of the liquids such that the annulus of the well is essentially empty except for the liquids flowing down the exterior of the tube;
4. managing the pumping and flow of the liquids such that the annulus of the well is essentially empty except for the liquids flowing down the exterior of the tube;
5. providing means for measuring and signaling a first temperature of the liquid as it flows into the well, and for measuring and signaling a second temperature of the liquid as it flows out of the well;
6. providing means for determining the difference between the first and second temperatures and, when the difference is in a specified range, signaling the signal controlled valving to adjust from the first operating condition to the second operating condition;
7. operating in this condition until the well is sufficiently clear of paraffin;

The apparatus which implements this method is straightforward. It is within the capabilities of persons of ordinary skill in the art to design and construct the apparatus to suit the requirements of the method. In a preferred embodiment of the invention the liquid is heated by a heat exchanger which is an insulated tank filled with a mixture of water and glycol with a system of tubing inside the tank through which the liquid to be heated is circulated. Pumping is provided by the well pump. Heat is provided by thermostatically controlled, electrically powered immersion heaters. System valves are powered with manual override and are controlled from a control box fed with system status signals. The oil is introduced into the well through a nozzle which directs the oil against the tube at an angle so that the oil flows down the exterior of the tube.

The invention is described below with reference to the attached drawings.

BRIEF DESCRIPTION OF THE DRAWINGS

FIG. 1 is a general illustration showing the apparatus of the subject invention trailer mounted and in use.

FIG. 2 is a schematic drawing of apparatus which implements the method of the subject invention.

DETAILED DESCRIPTION OF THE INVENTION

The subject invention is a method and for removing paraffin and asphaltene from producing oil wells. The invention can also be used in wells which are not in production; however, auxiliary pumping would be required since in usual operation the liquid circulation is provided by the production pump.

FIG. 1 is a general view of the apparatus 10 for implementing the method mounted on a trailer 11 and in use at a producing well 12. The primary component of the apparatus is heat exchanger 13. The heat is provided by electrically powered immersion heaters 14 and 15. The apparatus is operated from the control panel 16 on control box 17.

In basic terms the method of the invention is to bring the rod and tube of a well, including the paraffin and asphaltene between them, to temperatures at which the consistencies or viscosities of the paraffin and asphaltene are such that they are mixed into and carried by the liquid flow in the well. In an initial stage of the operation, all of the liquid in the well is circulated through the heat exchanger, along the exterior of the tube and out of the well back to the heat exchanger. In a second stage some of the liquid is recirculated and some of it is delivered to storage facilities. The transition from the first to the second stage is made when the difference between the temperature of the liquid leaving the well and that of the liquid entering the well is within a specified range.

FIG. 2 is a schematic drawing of one embodiment of apparatus for implementing the method of the subject invention. The apparatus 10, well 12, heat exchanger 13, immersion heaters 14 and 15, control panel 16 and control box 17 are numbered as in FIG. 1. Liquid is pumped from output port 18 on the well through line 19 to input port 20 on valve 21. Valve 21 is powered by actuator 22 which receives power and control signals from the control panel via cable assembly 23. The valve has two settings. In the first, for operation in the initial stage, all the flow from the well is passed through the valve to port 24 and through line 25 to inlet port 26 of the heat exchanger. The liquid then flows through line 27 picking up heat from the heated liquid 28 in the heat exchanger. The liquid leaves the heat exchanger through outlet port 29 and flows through line 30 to inlet port 31 in the well. In the other setting of valve 21, for the second operational stage, some of the liquid is directed through the heat exchanger and back to the well as described above and some flows through port 32 of the valve to storage facilities not shown. Temperature sensors 33 and 34 send electrical signals to the control box via conductors 35 and 36 respectively. These signals indicate the temperatures of the liquid flowing through lines 25 and 30 respectively. The controller automatically switches the operation from one stage to the other depending on the magnitude of the difference between the temperatures, switching to the second stage when the difference is relatively small and in a preset range. A fitting may be added to the valve to enable adding chemicals and the like to the liquid for various purposes.

The automatic operation of the equipment as described can be over-ridden by manual control if necessary to provide operating conditions in the well optimum for the treatment. For optimum treatment the annulus of the well is empty except near the bottom of the well. As is well known in the art, this condition is often achievable because the pumping rate of the well exceeds the inflow rate of liquids from the formation into the well and therefore the pump is either not operated at full capacity or not continuously. In any case, to implement the subject method as stated in the SUMMARY OF THE INVENTION, for the duration of each treatment the pump is operated at or near full capacity to recirculate the liquid from the well, through the heat exchanger and back into the well along the outer surface of the tube in the essentially empty annulus. The temperatures of the liquid, tube and rod are brought to levels high enough to free the paraffin, asphaltenes and the like for flow with the liquid to minimize the power required to operate the pump and provide other known benefits of removal of these materials.

It is now known that it is not necessary to have the equipment needed for paraffin and asphaltene removal installed permanently at each well. It is therefore much more economical to mount the equipment on a trailer according to the subject invention.

It is considered to be understandable from this description that the subject invention meets its objectives. It provides method and apparatus for a more cost effective technique for removing paraffin and asphaltene from producing oil wells and improves the function of the well.

It is also considered to be understood that While one embodiment of the invention is described herein, other embodiments and modifications of the one described are possible within the scope of the invention which is limited only by the attached claims.

I claim:

1. A method for removing paraffin and asphaltene from an oil well, said well comprising a tube having an outer surface, a rod, a casing and an annulus containing liquid, said rod being installed in said tube, said tube being installed in said casing, said annulus being between said outer surface and said casing, said method comprising the steps of:

a) providing means for heating said liquid;

b) providing means to cause flow of said liquid;

c) providing a storage facility;

d) providing means for directing said flow at an angle onto said outer surface such that the annulus is substantially empty except for the liquid on said outer surface;

e) providing thermostatically controlled means for adjusting said flow into a first stage in which said flow is directed into said well onto said outer surface, through said means for directing said flow along said outer surface and out of said well and into a second stage in which said flow is divided into first and second parts with said first part directed into said well through said means for directing said flow onto said outer surface, along said outer surface and out of said well and said second part directed into said storage facility;

f) flowing the heated liquid from the heating means through the means for directing downwardly along the outer surface to the bottom of the well and upwardly through the tube and back to the heating means during the first stage; and g) diverting said second part of the flow from the well to the storage facility while said first part is recirculated back to the well through the heating means during the second stage.

* * * * *